United States Patent [19]
Holly

[11] 4,334,339
[45] Jun. 15, 1982

[54] MOLD DEVICE WITH MOVABLE COMPRESSION INSERT

[75] Inventor: James A. Holly, Crestwood, Ill.

[73] Assignee: Hollymatic Corporation, Park Forest, Ill.

[21] Appl. No.: 149,050

[22] Filed: May 12, 1980

[51] Int. Cl.³ ............................................... A22C 7/00
[52] U.S. Cl. ........................................ 17/32; 426/513
[58] Field of Search ............... 17/32; 426/513; 53/122

[56] References Cited

U.S. PATENT DOCUMENTS

| | | | |
|---|---|---|---|
| 3,137,029 | 6/1964 | De Zolt | 17/32 |
| 4,018,030 | 4/1977 | Christensson | 53/527 |
| 4,043,728 | 8/1977 | Holy | 17/32 X |

Primary Examiner—Willie G. Abercrombie
Attorney, Agent, or Firm—Dressler, Goldsmith, Shore, Sutker & Milnamow, Ltd.

[57] ABSTRACT

A method and apparatus is provided for molding a patty of plastic food material wherein pressurized food material is supplied to a mold opening in a mold plate with a movable mold insert partially projecting into the mold opening. Relative movement is then effected between the mold opening and the insert so that the insert is effectively retracted from the mold opening thereby permitting expansion of the food material in the mold opening to provide a less dense patty of food material.

17 Claims, 8 Drawing Figures

MOLD DEVICE WITH MOVABLE COMPRESSION INSERT

DESCRIPTION

TECHNICAL FIELD

This invention relates to a method and apparatus for forming a molded patty of plastic food material, such as ground beef and the like.

BACKGROUND OF THE INVENTION

Patties of ground food material, such as ground beef and the like, can be molded automatically by machines feeding a supply of pressurized material into a mold cavity in a mold plate. In certain applications, as with ground beef and the like, it is desired to provide a patty having a predetermined density. Preferably, the density of the patty should be sufficient to provide the requisite shape-holding capability so that the patty does not fall apart during subsequent handling. However, it is also desirable to provide a patty that cooks quickly and uniformly and that has a sufficient void space to function as a reservoir for the cooking juices.

To meet these objectives with ground meat, it is desirable to reduce as much as possible the frictional forces on the surface of the meat during the feeding of the meat into the mold cavity. Surface forces can align the meat tissue in one direction and this will cause the patty to contract during cooking along the alignment direction more than in the transverse direction. This results in a cooked patty shape different than the original molded shape.

Attempts have been made over the years to produce a patty having the desired molded characteristics. Some such attempts have incorporated a process of forcing the plastic food material first through a restricted orifice region to form a thin ribbon and then into a larger volume mold cavity. The plastic food material expands outwardly into the larger mold cavity and forms a patty having a certain void capacity characteristic. An example of an apparatus for producing such a patty is that shown in the U.S. Pat. No. 4,118,831 to Holly et al.

Machines have been constructed and operated in accordance with the general principles taught by the above-identified Holly et al. patent. It is believed that, though such machines produce patties of ground meat with reduced tissue alignment, such machines are not without drawbacks.

For example, such machines typically include a cover plate with a concave tongue portion slidably disposed in a recessed top surface portion of the mold plate as illustrated in the Holly et al. patent. In the filling position, the cover plate is retracted in the mold plate recess to provide a passageway from the fill orifice in the fill plate to the mold plate mold opening. The forward edge of the fill plate fill opening is typically arcuate as is the forward edge of the cover plate tongue portion. However, the radius of the forward edge of the fill plate fill opening is typically greater than the radius of the forward edge of the cover plate tongue.

When the cover plate is retracted in the fill position, the meat is forced into the mold opening. Subsequently, the cover plate is moved forward to bring the forward edge of the cover plate tongue into registry with the mold plate mold opening. Thus, meat lying ahead of the cover plate tongue is forced into the mold opening and increases the density of the patty.

Additionally, since the radius of the curvature of the forward edge of the cover plate tongue is less than the forward edge of the overlying fill plate fill hole, meat tends to be compressed at both lateral side regions of the concave cover plate tongue below the larger radius forward edge of the overlying fill opening. This trapped meat is further squeezed into the patty in the mold opening. This tends to cause meat that has already been formed into the center part of the patty in the mold opening to be forced back outwardly to the edge of the patty and back up into the fill hole—at least until the cover plate tongue is moved completely into registry with the mold opening.

This is an undesirable "backflow" of meat from the formed patty and can cause additional working of the meat, which is undesirable. Further, the extra compression of the additional meat at both lateral side regions of the concave tongue of the cover plate can adversely affect the cooked shape of the patty, as well as the patty cooking time.

Although patties of ground beef produced with apparatus according to the teachings of the above-mentioned Holly et al. patent are an improvement over earlier prior art patties, there is a need for patties which are even lighter and fluffier, which cook more uniformly and more quickly, which retain more cooking juices, and which yield a greater cooked patty volume for a given amount of meat.

It would be desirable to provide a method and apparatus for producing a light, fluffy patty of plastic food material. It would be desirable to provide an apparatus and method especially adapted for use with ground beef and the like to produce a patty which cooks rapidly and quickly and which retains relatively large amounts of cooking juices.

Further, it would be desirable to provide such an apparatus having a relatively simple mold cavity and molding mechanism. Additionally, it would be beneficial if such a mold apparatus had a construction that is not easily susceptible to being plugged with the plastic food material. Further, such an apparatus should be simple to operate and easy to clean. This is especially desirable in those environments where such an apparatus would be used by generally unskilled labor, such as in fast food franchise restaurants and the like.

SUMMARY OF THE INVENTION

According to the preferred embodiment of the method of the present invention, a method for molding a patty of plastic food material includes the steps of first providing a plastic food material receiving mold defining a mold opening therein for forming a patty. The mold opening is adapted to receive a mold insert which is movable relative to the mold opening between a first position in which at least a portion of the insert extends into the mold opening to occupy a predetermined volume thereof and a second position in which the insert is retracted at least partially out of the mold opening relative to the first position to occupy a second predetermined volume of the mold opening that is less than the first predetermined volume.

Next, pressurized food material is directed into the mold opening with the mold insert in the first position. While retaining the pressurized food material within the mold opening, the further filling of the mold opening is terminated or at least adjustably reduced. With the pressurized food material still retained within the mold opening, the mold insert is retracted from the first position to the second position thereby permitting expansion of the food material in the mold opening to provide a less dense patty of food material which yields a greater cooked patty volume.

According to a preferred embodiment of the apparatus for molding a patty of food material, a mold means, such as a mold plate, is provided with a mold opening for receiving a supply of pressurized food material therein to mold a patty.

A fill means, such as a hopper with an auger feed, is positioned adjacent the mold plate for discharging pressurized food material into the mold opening.

A mold opening insert is provided for being received partially in the mold opening in a first position and for being retracted at least partially out of the mold opening relative to the first position (by the residual pressure of the formed patty in the mold opening) whereby, when the insert is in the first position, the food material can be forced under pressure into the mold opening from the fill means and compressed to a predetermined amount and whereby, when the mold insert is in the second position, the volume of the mold opening is increased to thereby decrease the pressure within the mold opening and permit expansion of the food material in the mold opening.

Finally, the apparatus is provided with a drive mechanism or means for moving either the mold plate or the mold opening insert relative to the other whereby the insert can assume the first or second position relative to the mold opening in the mold plate.

With the apparatus of this invention, it is believed that further advantages are realized in comparison with machines constructed and operated in accordance with the teachings of the aforementioned U.S. Pat. No. 4,118,831 to Holly et al. Specifically, since the mold insert of the present invention projects into the mold opening during the filling operation, the fill hole can be located over the projecting portion of the insert during the filling operation. Thus, the meat entering the mold opening from the fill hole does not have to travel the entire diameter of the mold opening before it impinges upon the wall of the mold.

In contrast, with machines constructed in accordance with the teachings of the U.S. Pat. No. 4,118,831, the fill hole is displaced some amount rearwardly of the mold opening and the meat must travel through a restricted passageway into the mold opening. This additional distance that the meat must travel can have a significant effect when operating at high production rates involving high meat injection speeds. The longer "meat travel distance" provides greater opportunity for the boundary layer friction to interfere with the flow of the meat and to contribute to the additional and undesired working of the meat, as well as to the undesired formation of tissue alignment in the meat.

In contrast, with the apparatus in the present invention, when the fill hole is located over the mold opening, the meat flow path is necessarily less, thus working the meat less and reducing the tendency to cause tissue alignment.

BRIEF DESCRIPTION OF THE DRAWINGS

In the accompanying drawings forming part of the specification, and in which like numerals are employed to designate like parts throughout the same.

DESCRIPTION OF THE PREFERRED EMBODIMENTS

While this invention is susceptible of embodiment in many different forms, there are shown in the drawings and will herein be described in detail preferred embodiments of the invention. It should be understood, however, that the present disclosure is to be considered as an exemplification of the principles of the invention and is not intended to limit the invention to the embodiments illustrated.

The precise shapes and sizes of the components herein described are not essential to the invention unless otherwise indicated, since the invention is described with reference to illustrative embodiments thereof.

For ease of description, the apparatus disclosed herein will be described in a normal (an upright) operating position and terms such as upper, lower, horizontal, etc., will be used with reference to this position. It will be understood, however, that the apparatus may be manufactured, stored, transported and sold in an orientation other than the position described.

The apparatus disclosed herein has certain conventional drive mechanisms and control mechanisms the details of which, though not fully illustrated or described, will be apparent to those having skill in the art and an understanding of the necessary functions of such mechanisms.

The choice of materials of the apparatus construction is dependent upon the particular application involved, and other variables, as those skilled in the art with appreciate.

In the following description, two digit numerals are used to refer to the embodiment illustrated in FIGS. 1–4, three digit numerals in the one hundred series are used to refer to the embodiment illustrated in FIG. 5, and three digit numerals in the two hundred series are used to refer to the embodiment illustrated in FIG. 6. The same last two digits in each numeral designate similar or functionally analogous elements in the various embodiments.

Figure 1:
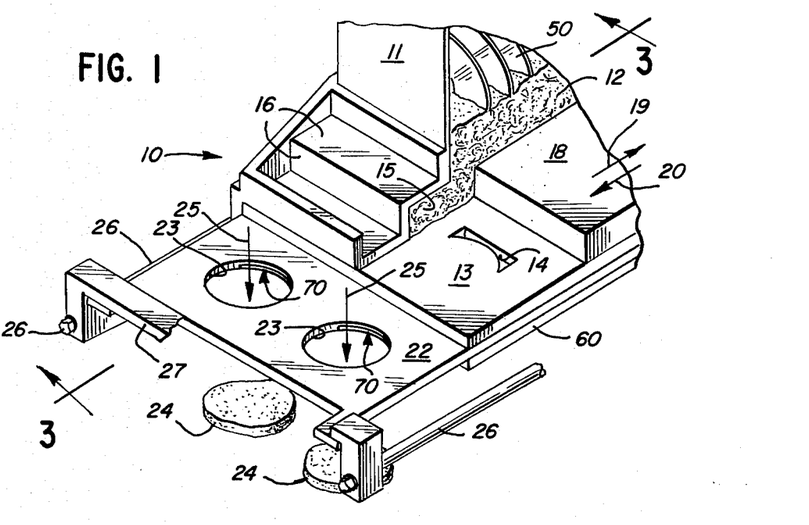
FIG. 1 is a fragmentary, perspective view partially broken away of a two-patty plastic food material molding device with a mold plate in the projected molded patty ejecting position.

FIG. 1 illustrates an apparatus 10 for molding a patty of plastic food material, such as ground meat and the like. The apparatus 10 includes a novel modification and improvement of the molding apparatus disclosed in the above-mentioned U.S. Pat. No. 4,118,831. Hence, some parts of the apparatus 10 are identical to those described in the U.S. Pat. No. 4,118,831 and operate in the same manner. Such parts include the hopper for supplying pressurized food material, the drive mechanisms and controls therefor associated with the hopper feed system and with the reciprocation of the mold plate, and the restricted mold opening supply passage. These various portions of the apparatus will be described in only so much detail as is necessary for a complete understanding of the novel methods and mechanisms of the present improvement. Reference is directed to the U.S. Pat. No. 4,118,831 for a more complete description of such apparatus parts. Such modifications as are necessary to adapt the apparatus disclosed in that patent to the present invention are disclosed in detail hereinafter. To the extent that the disclosure in U.S. Pat. No. 4,118,831 is not inconsistent with the present disclosure, it is expressly incorporated herein by this reference.

Of course, it is to be realized that the improvements disclosed herein are adaptable for use with other types of patty molding methods and apparatus. The principles of the apparatus modification and the method disclosed herein are applicable generally to the molding of a patty of plastic food material. It will be obvious to one skilled in the art how the apparatus improvement and method disclosed herein may be applied to such other apparatus.

Briefly, the molding apparatus 10 includes a hopper 11 adapted to contain plastic food material 12, such as ground meat and the like, which is supported on a top retainer fill plate 13 defining the hopper bottom.

The hopper 11 includes a pair of counter rotating side-by-side augers 50 which operate in the well-known conventional manner. Briefly, the augers 50 are turned in unison in increments to maintain the food material under pressure at the front portion of the hopper. The front portion of the hopper includes a heavy wall 16 defining a pressure chamber 15 thereunder.

Defined within the fill plate 13 are a pair of fill openings 14 (only one of which is visible in FIG. 1). The fill openings 14 are disposed at the forward end of the hopper 11 generally at the bottom of the pressure chamber 15. The fill openings 14 extend completely through the fill plate 13 to permit the passage of pressurized food material 12 therethrough.

Slidably disposed on the fill plate 13 within the hopper 11 is a pressure applying ram 18 which is adapted to slide in the hopper 11 on the fill plate 13. The ram 18 is adapted to be reciprocated by suitable drive means (not illustrated) in the directions of the arrows 19 and 20 so as to force the plastic food material under pressure towards the fill openings 14 when moving in the direction of arrow 20.

A bottom retaining plate 60 is mounted by suitable frame means (not shown) in spaced relation from the fill plate 13 and is fixed relative to the fill plate 13 in a generally parallel orientation with respect to the fill plate 13. Together, the fill plate 13 and the bottom retainer plate 60 define a generally right rectangular prism volume therebetween for receiving a mold means or plate 22 which is slidably disposed therein. The mold plate 22 has a pair of side-by-side mold openings 23 for shaping disc-like patties 24 from the plastic food material.

The mold plate is illustrated in FIG. 1 as being located in an extended molded patty ejecting position wherein the mold openings 23 are outwardly of the retainer plates 13 and 60 to permit ejection of the molded patties 24.

In FIG. 1, the patties 24 are shown, for illustrative purposes only, after removal from the mold openings 23. The removal of the patties 24 may be effected by any suitable conventional mechanism diagrammatically illustrated by arrows 25. Typically, the molded patties 24 are ejected downwardly out of the mold openings 23 to a suitable receiving conveyor device or the like.

The hopper 11, augers 50, ram 18, fill plate 13 and the associated drive mechanisms can be regarded as one form of a suitable fill means or supply means for charging the mold openings in the mold plate. The mold plate 22 is reciprocated relative to the upper retainer fill plate 13 and the bottom plate 60 between a retracted mold filling position (FIG. 3) and the extended molded patty ejecting position (FIG. 1) by a conventional drive mechanism. One such mechanism is that illustrated and described in the aforementioned U.S. Pat. No. 4,118,831 and includes a pair of side drive rods 26 that are substantially parallel to each other and a cross bar 27 connecting the forward ends of these rods 26. The cross bar 27 is connected to the mold plate 22. The drive rods are connected to a suitable driven linkage system (not illustrated) at the rear of the machine to intermittently move the mold plate 22 between the mold filling position and the molded patty ejecting position.

Figure 2:
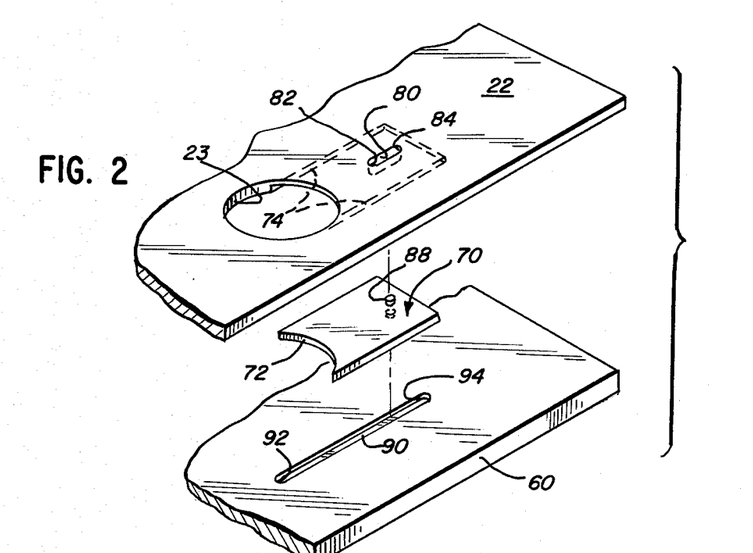
FIG. 2 is a fragmentary, exploded perspective view of the mold plate, mold opening insert, and bottom retainer plate of the molding device.
Figure 3:
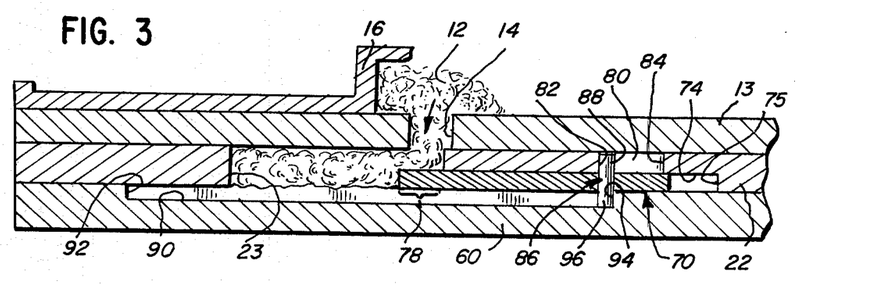
FIG. 3 is a greatly enlarged, fragmentary, cross-sectional view taken generally along the plane 3—3 in FIG. 1 but with the mold plate in the retracted, mold filling position.
Figure 4:
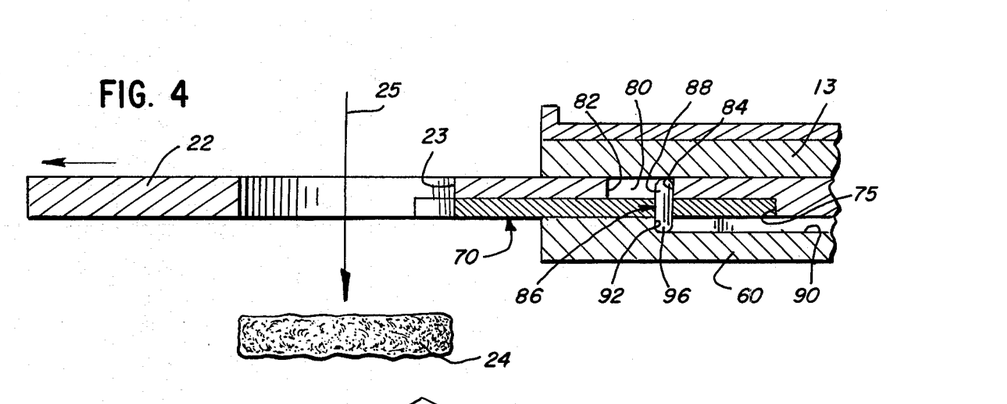
FIG. 4 is a view similar to FIG. 3 but showing the mold plate in the projected molded patty ejecting position.

To provide a restricted flow passageway into each mold opening 23 and to provide a means for expanding the pressurized food material in the mold opening, a mold opening insert 70 is slidably disposed within an insert receiving cavity 74 in the mold plate 22 below each fill opening 14, as illustrated in FIGS. 2, 3, and 4. Only one insert 70 and one receiving cavity 74 are visible in the figures. For ease of description, the visible insert and cavity will be described alone. It is to be understood that the pairs of inserts and cavities are identical and cooperate in the same manner.

Each insert 70 has a generally plate-like configuration with a concave surface region 72 which forms an arc of a circle preferably of the same diameter as the diameter of the circular mold opening 23 in the mold plate 22.

In addition, the radius of the arc of the insert region 72 is smaller than the radius of the front curved portion of the overlying fill hole 14. However, it may have the same radius or a larger radius. Also, the configuration of the fill hole and insert region 72 may be different than that illustrated.

The insert receiving cavities 74 each communicate at one end with a mold opening 23. Each insert receiving cavity 72 has a shape for matingly receiving in sliding engagement therewith the associated insert 70. When the mold plate 22 is in the retracted mold filling position illustrated in FIG. 3, the insert 70 occupies a first position relative to the mold plate 22 in which a leading end portion 78 of the insert projects into the mold opening 23 a predetermined amount.

When the mold plate 22 is in the molded patty ejecting position illustrated in FIG. 1, the insert 70 occupies a second position relative to the mold plate 22 in which the insert 70 projects into the mold opening 23 less than in the first position. Preferably, and as illustrated in FIG. 1, the mold insert 70 is fully retracted relative to the mold opening 23 in the second position so that the circular arc surface 72 of the insert is substantially coincident with the cylindrical surface of the mold opening 23 in the mold plate 22.

To effect the movement of the mold insert 70 between the first and second positions relative to the mold plate 22, the mold plate 22 defines therein a mold plate channel 80 opening toward the insert 70 and having first and second end walls 82 and 84, respectively. The insert 70 is provided with a pin 86 having a top portion 88 projecting above the plate 70 for being received in the channel 80. The pin top portion 88 functions as an outwardly projecting engageable member for being engaged by the channel opposed end walls 82 and 84. Conversely, the channel end walls 82 and 84 function as first and second engaging means, respectively, relative to the pin top portion 88.

When the mold plate 22 is in the retracted mold filling position illustrated in FIG. 3, the pin upper portion 88 is engaged by the first engaging means or channel end wall 82. On the other hand, when the mold plate 22 is in the extended molded patty ejecting position illustrated in FIG. 4, the pin top portion 88 is engaged by the second engaging means or channel end wall 84. It is to be noted that in FIG. 4, there has been movement of the insert 70 relative to the mold 22 so that the insert 70 is retracted out of the mold opening 23.

The bottom retainer plate 60 preferably defines a retainer plate 22 channel 90 opening toward the mold plate and extending along a line generally parallel to the direction of the mold plate reciprocation. The retainer plate channel 90 has first and second end walls, 92 and 94 respectively. The channel 90 is adapted to receive a downwardly projecting portion or guide member 96 of the pin 86 carried on the insert 70.

When the mold plate 22 is in the retracted filling position illustrated in FIG. 3, the bottom end portion 96 of the insert pin 86 is engaged by the bottom retainer plate channel end wall 94. This maintains the insert 70 with the front portion 78 of the insert projecting into the mold opening 23 as pressurized food material is forced into the mold opening 23. The reaction force on the insert 70 is transferred through the pin 86 to the bottom retainer plate 60 at the channel end wall 94. With the guide member 96 engaged with the channel end wall 94, the insert 70 is spaced from the end wall 75 of the insert receiving cavity 74 as illustrated in FIG. 3. Of course, it is to be realized that other means may be used to prevent the pressurized food material from forcing the insert 70 out of the mold opening 23 when the mold is being filled with the mold plate in the mold filling position.

In FIG. 4, the downwardly projecting portion 96 of the insert pin 86 is shown engaged with the channel end wall 92 in the bottom retainer plate 60. This engagement ensures that the insert 70 is withdrawn from the mold opening in the molded patty ejecting position. Further, the engagement in effect limits the combined forward movement of the insert 70 and the mold plate 22.

According to the method of molding a patty of plastic food material with the apparatus described, the plastic food material is supplied under pressure from hopper 11 through fill hole 14 into the mold opening 23 with the mold plate 22 in the mold filling position (FIG. 1) and with the insert in the first position (with the leading portion 78 of the insert 70 projecting into the mold opening). The pressurized food material impinges upon the leading portion 78 of the insert 70 and is forced outwardly across the mold opening 23. It is believed that the food material flows in the mold opening 23 as a thin ribbon in a manner that reduces boundary layer friction. In the case of ground meat, undesirable tissue alignment, tissue stretching, and other distortions are believed to be substantially reduced. After a predetermined amount of food material is forced into the mold opening, the feeding of the material is terminated.

It is to be realized that when the mold opening is filled with pressurized food material, the pressure on the mold insert 70 creates a force tending to keep the insert 70 maintained in the position illustrated in FIG. 3 where the guide member 96 is engaged by the bottom retainer plate channel end wall 94.

The material is retained within the mold opening between the fill plate 13 and the bottom retainer plate 60 as the mold insert is retracted from the mold opening to permit expansion of the food material in the mold opening to provide a less dense patty of food material. In the embodiment illustrated in FIGS. 1-4, this is accomplished by moving the mold plate 22 relative to the insert 70 until the leading edge 78 of the insert 70 is projecting into the mold opening 23 by a lesser amount, and preferably, until the leading edge of the insert is in registration with the peripheral wall of the mold opening. During this movement of the mold plate 22, the mold opening 23 is moved away from the fill hole 14 communicating with the hopper 11. The mold plate 22 and insert 70 begin to move together toward the molded patty ejecting position when the mold plate channel end wall 84 contacts the insert pin 86.

It is to be realized that as the mold plate is moved toward the molded patty ejecting position, some pressurized food material may continue to be forced into the mold opening, at least until the mold plate has completely blocked off the fill opening 14 in the fill plate 13. This additional filling of the mold opening is adjustable and can be varied by appropriately controlling the stroke or compression force of the hopper ram 18.

Continued movement of the mold plate 22 brings the mold plate opening 23 to the mold patty ejecting position. At this point the molded patty, now expanded to a less dense configuration, may be ejected by conventional means as illustrated by the arrow 25 in FIG. 4. In the molded patty ejecting position the retainer plate end wall 92 engages the insert pin 86 and prevents further movement of the insert and mold plate. Alternatively, the mold plate movement may be stopped at the molded patty ejecting position by other means before the insert pin contacts the channel end wall.

Subsequently, the mold plate 22 is returned to the mold filling position. Initially as the mold plate 22 is moved toward the mold filling position, the insert 70 is not positively driven or carried by the mold plate 22 because of the lost motion incorporated in the mold plate design. As soon as the end wall 82 of the mold plate channel contacts the pin portion 88 of the insert 70, the insert 70 is carried with the mold plate 22 to the mold filling position. However, by this time the mold plate 22 has moved relative to the insert 70 so that a portion 78 of the insert 70 projects into the mold opening 23 a predetermined amount.

With reference to FIG. 4, it can be seen that the pin upper portion 88 of the insert 70 engages the end wall 84 of the mold plate channel 80 when the mold plate is in the molded patty ejecting position. This engaging arrangement is not necessary for proper operation of the apparatus. If desired, the mold plate channel 80 could be further elongated (to the right as viewed in FIG. 4) so that the pin upper end portion 88 would not engage the channel end wall 84 when the mold plate was in the molded patty ejecting position. It is to be noted that the mold insert 70 can be moved from the retracted mold filling position to the extended molded patty ejecting position with the mold plate 22 by means of the mold plate cavity end wall 75 engaging the back of the insert as illustrated in FIG. 4.

With continued reference to FIG. 4, it is also to be realized that the lower pin portion or guide member 96 engages the bottom retainer plate channel end wall 92 when the mold plate 22 is in the molded patty ejecting position to ensure that the insert 70 is not extending or projecting into the mold opening. Thus, possible damage to the mold insert is avoided when the molded patty 24 is ejected by a patty ejecting device (illustrated only schematically by arrow 25 in FIG. 4). However, it is not necessary that this form of positive engagement be provided.

The bottom retainer plate channel 90 could be extended (further to the left as viewed in FIG. 4) so that the channel end wall 92 would be spaced away from (to the left of) the guide member 96 in the molded patty ejecting position. The mold plate 22 could be stopped at the molded patty ejecting position by the drive mechanism or by a suitable abutment (not illustrated). With that modification, complete reliance is placed upon the capability of the pressurized molded patty to move the projecting portion of the insert 70 out of the mold opening 23.

Figure 5:
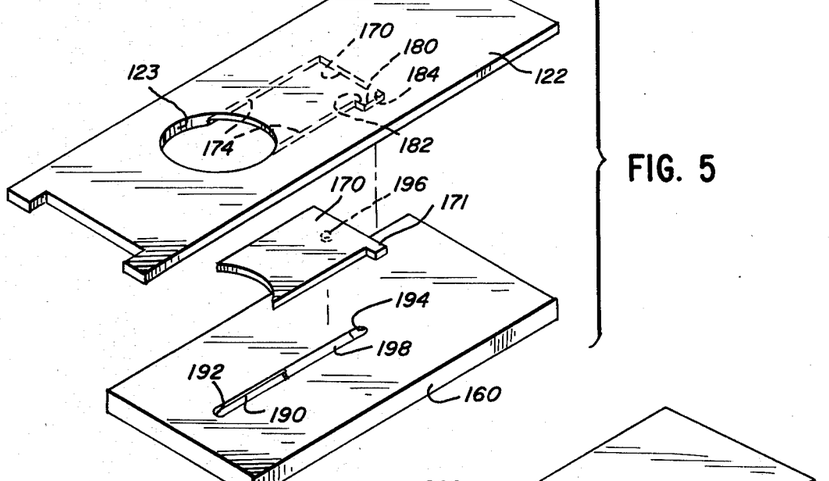
FIG. 5 is an exploded, perspective view of a second embodiment of an assembly of a mold plate, mold opening insert, and bottom retainer plate assembly.

FIG. 5 illustrates a second embodiment of the apparatus wherein a mold plate 122 is provided with a mold opening 123 and a mold insert receiving cavity 174. The mold insert receiving cavity 174 is adapted to receive in slidable engagement therewith an insert 170. For ease of explanation and to simplify understanding of the apparatus, the mold plate 122 is shown with only one mold opening 123. It is to be understood that two or more mold openings 123 may be provided and it is to be understood that the mold plate is adapted to be incorporated in a molding apparatus such as apparatus 10 illustrated in FIG. 1 and described above.

The mold insert 170 does not have an upwardly projecting pin portion, such as portion 88 for the embodiment of the insert 70 illustrated in FIG. 2. Rather, insert 170 has a planar configuration with a lug 171 projecting laterally outwardly therefrom.

The mold plate 122 has a mold plate channel 180 opening toward and communicating with the insert receiving cavity 174. The channel 180 can be said to be formed as a laterally offset region of the insert receiving cavity 174. The channel 180 has opposed end walls 182 and 184 and is adapted to receive therein the outwardly projecting engageable lug 171 of the insert 170. However, the channel 180 has a dimension as measured along the direction parallel to the reciprocation of the mold plate 122 greater than that of the lug 171. This permits the insert 170 to move between the first insert position in which a portion of the insert projects into the mold opening 123 and a second insert position in which the insert projects into the mold opening 123 less than in the first insert position.

A bottom retainer plate 160 is provided in the same manner as the bottom retainer plate 60 in the embodiment illustrated in FIG. 1. For ease of description, the peripherally attached drive rod mechanism, the overlying fill plate, and the hopper are not shown.

The retainer plate 160 defines a retainer plate channel 190 having an end wall 192 and an end wall 194. The insert 170 has a downwardly projecting guide member 196 which is adapted to be received within the channel 190 and to be engaged at least at the channel end wall 194 when the mold plate 122 is in the mold filling position so as to prevent the pressurized food material from forcing the insert 170 completely out of the mold opening 123.

A resilient rubber insert 198 may be provided in the bottom retainer plate 160 in the channel 190. In FIG. 5, only a fragmentary position of the insert 198 is shown to permit illustration of the channel 190. The insert 198 is understood to extend the entire length of the channel 190, however. The guide member 196, received in the channel 190, depresses the resilient insert 198 into the channel 190 as the insert 170 reciprocates on the bottom retainer plate 160. In this manner, the insert 198 functions to prevent plastic food material from accumulating within the channel 190. Though desirable, the insert 198 is not necessary for proper operation. Such an insert may be employed in a similar manner, if desired, on the first embodiment of the apparatus 10 illustrated in FIGS. 1-4 and described above.

Movement of the mold plate 122 from the mold filling position to the molded patty ejecting position (from right to left as viewed in FIG. 5) will cause the end wall 184 of the insert receiving cavity 174 to engage the lug 171 of the insert 170, but only after the mold plate 122 has first moved a predetermined amount relative to the insert 170. At that point, the insert will have been relatively retracted from the mold opening and the insert 170 will then be carried with the mold plate 122 as the mold plate 122 continues to be moved to the molded patty ejecting position.

Similarly, when the mold plate 122 is moved back to the mold filling position, the insert 170 is not initially engaged until the end wall 182 engages the lug 171. At this point, the mold plate 122 has moved a predetermined distance relative to the insert 170 so that a leading portion of the insert 170 projects into the mold opening 123. Continued movement of the mold plate 122 carries the insert 170, projecting into the mold opening 123, back to the mold filling position.

Figure 6:
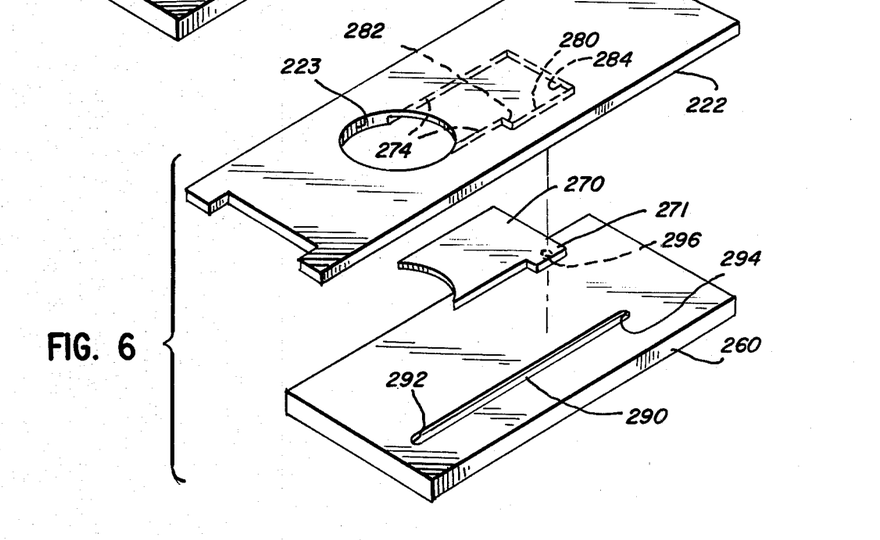
FIG. 6 is an exploded perspective view of a third embodiment of an assembly of a mold plate, mold opening insert, and bottom retainer plate assembly.

The third embodiment of the apparatus is illustrated in FIG. 6 where, for purposes of clarity and ease of description, the peripheral drive rod mechanism, the overlying fill plate, and the hopper structure are not shown.

A mold plate 222 is provided with a shape basically similar to mold plate 122 for the second embodiment illustrated in FIG. 1 and described above. For simplicity and ease of description, the mold plate is shown with one mold opening 223. It is to be understood that a plurality of mold openings may be defined in the mold plate 222.

An insert receiving cavity 274 is provided in the bottom of the mold plate 222 and communicates on one end with the mold opening 223. A mold plate channel 280 is defined in the mold plate 220 and opens inwardly toward, and communicates with, the insert receiving cavity 274. The mold plate channel 280 can be said to be formed from a laterally offset region of the insert receiving cavity 274. The channel is defined at opposite ends by a first end wall 282 and a second end wall 284.

The insert receiving cavity 274 and channel 280 are adapted to receive in sliding engagement therewith an insert 270 which has an outwardly projecting engageable member or lug 271. The lug 271 is adapted to be disposed within the channel 280 and engaged on either end by the channel end walls 282 and 284. The lug 271 carries a downwardly projecting guide member 296.

A bottom retainer plate 260 is provided with a longitudinally extending channel 290 opening toward the overlying mold plate 222 and is adapted to receive therein the insert guide member 296. The channel is defined at opposite ends by end walls 292 and 294. The channel 290 is laterally displaced or offset relative to the mold opening 223 and insert receiving cavity 274 of the mold plate 222. The offset relationship of the channel 290 relative to the mold opening 223 prevents an accumulation of plastic food material in the channel 290. Thus, a flexible cover over the channel is not needed to keep food material out of the channel. In other respects, the operation of the mold plate 222, insert 270, and the bottom retainer plate 260 is the same as for the second embodiment illustrated in FIG. 5 and described above.

Figure 7:
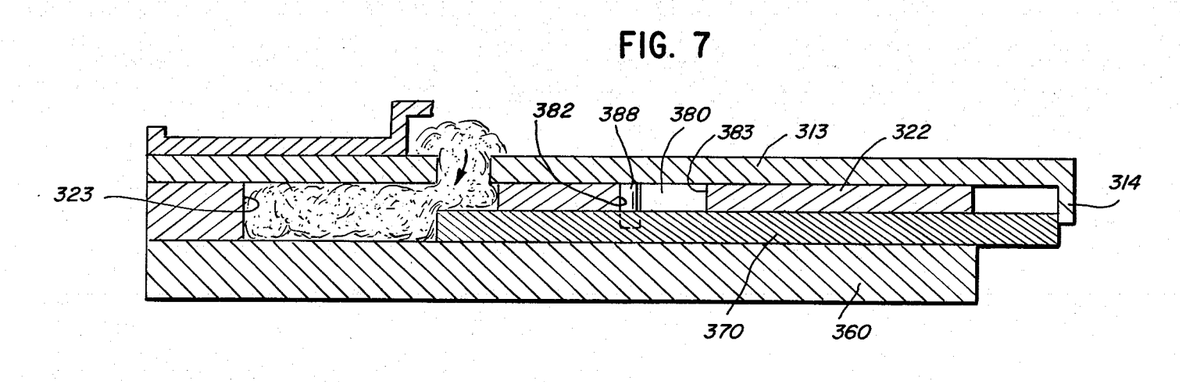
FIG. 7 is a view similar to FIG. 3, but showing a fourth embodiment of the present invention.

FIG. 7 illustrates a fourth embodiment of the apparatus similar to the first embodiment illustrated in FIG. 3 with a top retainer or fill plate 313, a mold plate 322, a mold insert 370, and a bottom retainer plate 360. However, in this fourth embodiment, the insert plate 370 does not have a bottom engaging pin and the bottom retainer plate does not have a receiving groove. Rather, the mold insert is relatively long and extends beyond the back end (right-hand end as viewed in FIG. 7) of the mold plate 322.

Further, the end of the fill plate 313 is provided with a stopping lug 314 adapted to contact the back end of the mold insert 370. The length of the insert 370 and location of the lug 314 is determined so that the leading portion of insert 370 projects into the mold opening 323 of the mold plate 322 when the mold plate is in the retracted filling position illustrated in FIG. 7. This prevents the mold insert 370 from being pushed out of the mold opening (to the right as viewed in FIG. 7) when pressurized meat is forced into the mold opening. However, when the mold plate 322 is moved to the molded patty ejecting position (to the left as viewed in FIG. 7), the pressurized food material within the mold opening 323 expands and continues to urge the mold insert 370 against the lug 314 until the mold plate 322 has moved an amount relative to the insert 370 sufficient to render the mold opening 323 completely free of the projecting portion of the insert 370.

As in the first embodiment of the apparatus illustrated in FIGS. 3 and 4, the mold plate has a channel 380, defined between front end wall 382 and rear end wall 383, for receiving a pin 388 of the insert 370.

The front end wall 382 engages pin portion 388 to move the insert 370 along with the mold plate 322 to the mold filling position. The rear end wall 383 of the channel 380 is adapted to engage the pin portion 388 and to thus move the insert 370 with the mold plate 322 to the molded patty ejecting position after the pressurized food material has been allowed to expand in the mold opening 323 so as to occupy the volume previously occupied by the projecting portion of the insert 370.

Figure 8:
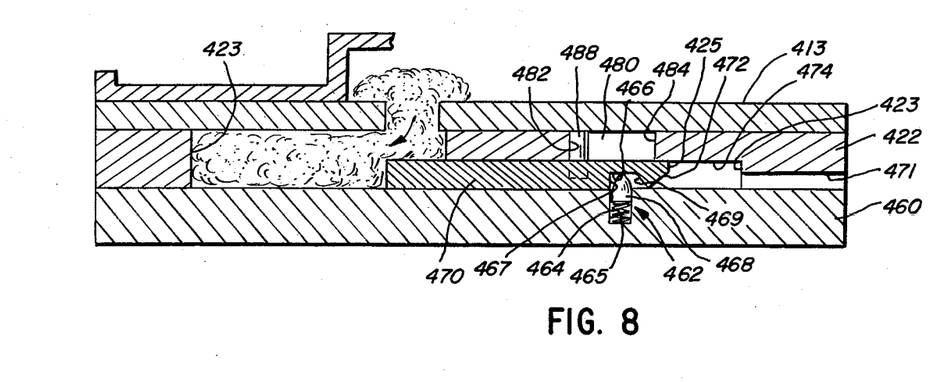
FIG. 8 is a view similar to FIG. 3, but showing a fifth embodiment of the present invention.

FIG. 8 is a view similar to FIG. 3 but illustrates a fifth embodiment of the present invention in which a top fill plate 413 and a bottom retainer plate 460 retain a mold plate 422 therebetween. The mold plate 422 defines a mold opening 423 therein and an insert receiving cavity 474. The insert receiving cavity 474 is adapted to receive in slidable engagement therewith an insert 470.

The insert 470 is carried by the mold plate 422 from the fill position illustrated in FIG. 8 to the extended molded patty ejecting position. To this end, mold plate 422 has a wall 423 to engage a back end wall 425 of the insert 470.

The mold plate 422 is provided with a channel 480 with a rear end wall 484 and a front end wall 482. The channel 480 receives therein an upwardly projecting pin portion 488 which is mounted in the insert 470. The pin portion 488 and groove 480 function as the groove 80 and pin 88 of the first embodiment illustrated in FIG. 3. That is, when the mold plate 422 is moved from the molded patty ejecting position (to the right as viewed in FIG. 8), the front end wall 482 engages the pin 488 to then move the insert 470 with the mold plate 422 to the retracted filling position illustrated in FIG. 8.

Of course, the pin portion 488 and channel 480 also function to eliminate having to drive the insert 470 forward with the mold plate wall 423. Instead, the insert 470 could be driven forward with the mold plate 422 by means of the channel rear wall 484 engaging pin 488.

A novel detent means 462 is provided to terminate or limit the movement of the insert 470 at the mold filling position. Specifically, the bottom retainer plate 460 defines a bore 464 in which is received a compression spring 465 and a one-way locking member 468. The locking member may have a somewhat rounded or spherical portion projecting above the top surface of the bottom retainer plate 460 and is biased outwardly to the position illustrated in FIG. 8 by the compression spring 465.

The insert 470 is provided with a suitably positioned recess 466. The recess has a generally vertical front wall 467 and a generally slanted rear wall 469. The slanted rear wall 469 permits the insert 470 to be carried with the mold plate 422 to the molded patty ejecting position by forcing the locking member 468 downwardly into the bore 464 as the insert 470 passes over the member 468.

Since the insert 470 is carried to the molded patty ejecting position (to the left as viewed in FIG. 8) by means of the mold plate 422, the mold plate 422 is preferably provided with a clearance groove 471. Thus, when the rear portion of the mold plate 422 passes over the locking member 468, the locking member 468 is not forced downwardly against the biasing spring 465 and undue wear on the moving parts is avoided.

In order to return the mold plate 422 and insert 470 to the retracted mold filling position illustrated in FIG. 8, the mold insert 470 must pass over the upwardly biased locking member 468. To this end, the rear end of the insert 470 is provided with a slanting wall 472 which engages the projecting locking member 468 and forces it downwardly into the bore 464 against the biasing spring 465. In this manner, the insert 470 can pass over the bore 464 until the insert recess 466 is aligned over the bore 464. At that point, the locking member 468 is thus free to be biased upwardly by the spring 465 and into engagement with the generally vertical wall 467 of the insert 470. This prevents further movement of the insert to the right as viewed in FIG. 8 and ensures that the leading portion of the insert 470 will be projecting into the mold opening 423 as is desired.

If the channel 480 in the mold plate is provided as illustrated in FIG. 8, the front end wall 482 of the channel 480 engages the pin 488 and, since the insert 470 is prevented from moving further to the right, the mold plate 422 is necessarily also prevented from moving further to the right. In this manner, both the mold plate 422 and the insert 470 are properly positioned in the mold filling position.

From the foregoing, it will be observed that numerous variations and modifications may be effected without departing from the true spirit and scope of the novel concept of the invention. It is to be understood that no limitation with respect to the specific apparatus and method illustrated and described herein is intended or should be inferred. It is, of course, intended to cover by the appended claims all such modifications as fall within the scope of the claims.

What is claimed is:

1. An apparatus for molding a patty of plastic food material, such as ground meat and the like, comprising:
   supply means for providing said food material under pressure;
   a bottom plate;
   a fill plate spaced from and disposed over said bottom plate and fixed relative to said bottom plate, said fill plate defining therein a fill opening communicating with said food material supply means and adapted to permit the passage of pressurized food material from said supply means through said fill plate;
   a mold plate slidably disposed between said fill and bottom plates and having a mold opening for receiving said food material under pressure through said fill plate opening, said mold plate being adapted to be reciprocated relative to said fill and bottom plates between a retracted mold filling position and an extended molded patty ejecting position;
   means for reciprocating said mold plate between said mold filling and patty ejecting positions;
   a mold opening insert slidably mounted for reciprocative movement relative to said fill and bottom plates in a direction parallel to the movement of said mold plate and adapted to permit relative movement of said mold plate so that a portion of said insert projects into said mold opening when said mold plate is in said mold filling position and so that said portion of the insert is retracted from said mold opening when said mold plate is in said patty ejecting position;
   said mold plate including first engaging means for engaging a portion of said insert after said mold plate is moved a predetermined distance relative to said insert from said patty ejecting position toward said mold filling position, at which predetermined distance said insert projects into said mold opening a predetermined amount; and
   said mold plate further including second engaging means for engaging a portion of said insert after said mold plate is moved said predetermined distance relative to said insert away from said mold filling position toward said patty ejecting position to thereby move said insert with said mold plate with said insert retracted from said mold opening, whereby pressurized food material in said mold opening can expand to fill the volume previously occupied by said insert portion within said mold opening.

2. The apparatus in accordance with claim 1 in which said bottom plate includes a channel opening towards said mold plate and extending along a line generally parallel to the direction of the mold plate reciprocation, and in which said insert includes a guide member projecting into said channel for guiding said insert relative to said bottom plate.

3. The apparatus in accordance with claim 2 in which said channel in said bottom plate is disposed generally below said mold opening in said mold plate.

4. The apparatus in accordance with claim 2 in which said channel in said bottom plate is offset from said mold opening in said mold plate.

5. The apparatus in accordance with claims 3 or 4 in which said channel includes an end wall adapted to engage said projecting guide member when said mold plate is in said mold filling position with said insert projecting into said mold opening thereby preventing said insert from being forced out of said mold opening when said mold opening is pressurized with said food material.

6. The apparatus in accordance with claim 2 further including a generally flexible cover disposed over the channel opening and adapted to be depressed inwardly by said guide member.

7. An apparatus for molding a patty of plastic food material, such as ground meat and the like, said apparatus comprising:
   a bottom support plate;
   a mold insert slidably disposed on said bottom plate;
   a mold plate slidably disposed on said bottom plate for reciprocal movement between a retracted mold filling position and an extended molded patty ejecting position, said mold plate defining a mold opening and an insert receiving cavity, said insert receiving cavity communicating on one end with said mold opening, said mold plate further including first and second spaced apart engaging means for engaging portions of said insert, said first engaging means engaging a portion of said insert when said mold plate is in said mold filling position whereby a portion of said insert extends into said mold opening to occupy a predetermined volume thereof, said second engaging means spaced from said first engaging means by a predetermined distance to engage a portion of said insert after said mold plate has been moved from said mold filling position in a direction towards said patty ejecting position by an amount equal to said predetermined distance;
   fill means overlying said mold plate for discharging pressurized food material into said mold opening when said mold plate is in said mold filling position, said fill means being positioned relative to said mold plate for blocking said mold opening when said mold plate is moved away from said mold filling position; and
   means for reciprocating said mold plate between said mold filling position and said patty ejecting position whereby, when said mold plate is in said mold filling position, said food material is forced under pressure into said mold opening and compressed to a predetermined amount and whereby, when said mold plate is moved to said patty ejecting position, the amount of volume in said mold opening occupied by said insert is reduced compared to the amount of volume occupied by said insert when said mold plate is in said mold filling position thereby decreasing the pressure within said mold opening and permitting expansion of said food material in said mold opening.

8. The apparatus in accordance with claim 7 in which said bottom support plate includes a channel opening toward said mold plate and extending along a line generally parallel to the direction of the mold plate reciprocation, said channel having at least one end wall, and in which said insert includes a guide member projecting into said channel for guiding said insert relative to said bottom plate and for abutting said channel end wall when said mold plate is in said mold filling position with said insert extending into said mold opening to thereby prevent said insert from being forced out of said mold opening when said food material is discharged into said mold opening from said fill means.

9. An apparatus for molding a patty of plastic food material, such as ground meat and the like, comprising:
supply means for providing said food material under pressure;
spaced-apart retainer plates adjacent said food material supply means, one of said plates defining a fill hole communicating with said food material supply means for permitting the passage of pressurized food material therethrough;
a mold plate slidably disposed between said retainer plates and defining a mold opening for receiving said food material from said supply means through said fill opening, said mold plate further defining an insert cavity communicating at one end with said mold opening;
means for reciprocating said mold plate between a retracted mold filling position and an extended molded patty ejecting position;
a mold opening insert slidably mounted for movement within said insert cavity between a first insert position in which a portion of said insert projects into said mold opening and a second insert position in which said insert projects into said mold opening less than in said first insert position;
first engaging means on said mold plate for engaging said insert in said first insert position for moving said insert with said mold plate from said patty ejecting position to said mold filling position;
second engaging means on said mold plate for engaging said insert in said second insert position for moving said insert with said mold plate from said mold filling position to said patty ejecting position whereby, when said mold plate is in said mold filling position, said food material can be forced under pressure into said mold opening and compressed to a predetermined amount, and whereby, when said mold plate is moved to said patty ejecting position, the amount of volume in said mold opening occupied by said insert is reduced compared to the amount of volume occupied by said insert when said mold plate is in said mold filling position thereby decreasing the pressure within said mold opening and permitting expansion of said food material in said mold opening.

10. The apparatus in accordance with claim 9 in which one of said retainer plates includes a retainer plate channel opening toward said mold plate and extending along a line generally parallel to the direction of the mold plate reciprocation, said retainer plate channel having an end wall, and in which said insert includes a guide member projecting into said channel for guiding said insert relative to said one retainer plate and for engaging said retainer plate channel end wall when said mold plate is in said mold filling position with said insert in said first insert position to thereby prevent said insert from being forced away from said first insert position by the pressurized food material.

11. The apparatus in accordance with claim 10 in which said insert includes an outwardly projecting engageable member and in which said mold plate includes a mold plate channel opening toward said insert for receiving said insert engageable member therein and in which said first and second engaging means are defined, respectively, by opposing first and second end wall surfaces of said channel in said mold plate.

12. The apparatus in accordance with claim 11 in which said insert is a substantially planar member, in which said insert engageable member is defined by a lug projecting laterally from said planar member, and in which said mold plate channel includes a laterally offset region of said insert receiving cavity having a dimension as measured along the direction parallel to the reciprocation of said mold plate greater than that of said insert lug.

13. The apparatus in accordance with claim 10 in which food material supply means includes a fill plate defining a fill hole adapted to communicate with said mold opening when said mold plate is in said mold filling position.

14. The apparatus in accordance with claim 13 in which said fill hole in said fill plate is positioned relative to said mold plate when said mold plate is in said mold filling position with said fill hole adjacent one edge of said mold opening and opposite the portion of said insert projecting into said mold opening.

15. The apparatus in accordance with claim 9 in which said mold opening insert defines a recess that is open to one of said retainer plates and that is defined, at least in part, by a first wall portion generally normal to said one retainer plate and a second wall portion at an angle with respect to said one retainer plate; in which said one retainer plate defines a bore therein opening to said insert; and in which said one retainer plate further includes a spring disposed within said bore and a one-way locking member mounted within said bore and biased outwardly by said spring for being received in said insert recess.

16. The apparatus in accordance with claim 15 further including a channel in said mold plate that is open to said one retainer plate for providing clearance over said locking member in said one retainer plate when said mold plate is moved from said retracted mold filling position to said extended molded patty ejecting position.

17. The apparatus in accordance with claim 16 in which said insert further includes at one end a generally angled wall portion for impinging upon said locking member and urging said locking member against said spring into said retainer plate bore when said insert is carried with said mold plate from said molded patty ejecting position to said retracted mold filling position.

* * * * *